United States Patent [19]

Luebkemann

[11] 4,030,178

[45] June 21, 1977

[54] METHOD OF MANUFACTURING TRACK ROLLER WITH OPEN CELL PLASTIC FOAM IN LUBRICATION CAVITY

[75] Inventor: Leroy Luebkemann, Springfield, Ill.

[73] Assignee: Fiat-Allis Construction Machinery, Inc., Deerfield, Ill.

[22] Filed: Aug. 4, 1975

[21] Appl. No.: 601,669

Related U.S. Application Data

[62] Division of Ser. No. 491,768, Aug. 6, 1974, Pat. No. 3,955,646.

[52] U.S. Cl. .................. 29/149.5 NM; 184/1 E; 184/12; 305/14; 305/52; 308/109; 308/111; 308/103; 308/104; 308/125
[51] Int. Cl.² ........................................ B21D 53/10
[58] Field of Search ............... 184/1 E, 1 D, 12; 308/109, 111, 121, 103, 104, 125; 305/14, 52; 29/149.5 NM, 149.5 PM

[56] References Cited

UNITED STATES PATENTS

| | | | |
|---|---|---|---|
| 2,591,612 | 4/1952 | Rowe et al. | 19/142 |
| 2,686,155 | 8/1954 | Willis et al. | 252/12 |
| 2,921,866 | 1/1960 | Wilson | 117/118 X |
| 2,926,968 | 3/1960 | Toth | 305/1 |
| 3,055,297 | 9/1962 | Leeds | 101/327 |
| 3,114,722 | 12/1963 | Einhorn et al. | 260/2.5 |
| 3,138,856 | 6/1964 | Kuchek | 29/424 UX |
| 3,190,842 | 6/1965 | Ringwood et al. | 260/2.5 |
| 3,246,443 | 4/1966 | Slemmons | 161/43 UX |
| 3,260,618 | 7/1966 | Stark | 117/102 |
| 3,298,857 | 1/1967 | Terry | 112/118 X |
| 3,307,318 | 3/1967 | Bauman | 161/43 X |
| 3,310,615 | 3/1967 | Bender | 264/45 |
| 3,401,128 | 9/1968 | Terry | 260/2.5 |
| 3,419,134 | 12/1968 | Fitts | 264/45 UX |
| 3,503,177 | 3/1970 | Kropscott et al. | 264/45 X |
| 3,527,852 | 9/1970 | Thill | 264/45 |
| 3,546,841 | 12/1970 | Smith et al. | 264/45 X |
| 3,557,264 | 1/1971 | Getz et al. | 264/45 |
| 3,794,549 | 2/1974 | Schroteler | 161/43 |
| 3,867,492 | 2/1975 | Drostholm | 29/451 |

Primary Examiner—C.W. Lanham
Assistant Examiner—V. K. Rising
Attorney, Agent, or Firm—Robert A. Brown; Thomas F. Kirby

[57] ABSTRACT

A roller for a continuous track on a crawler tractor or the like comprises two sections welded together to define an interior lubrication cavity which communicates by means of lubrication passages to spaces containing bearings and to an exterior lubrication port. Liquid plastic material capable of in situ foaming to form an open cell plastic mass is injected into the cavity and passages wherein it sets into an open cell plastic mass. Subsequently, lubricating oil or grease is injected under pressure through the lubrication port to fill the open cells of the plastic mass for storage and subsequent supply to the bearings through the lubrication passages. The open cell plastic mass also provides a barrier or filter for particles of contaminants disposed in the cavity as a result of welding and other manufacturing steps and prevents circulating of such particles with the lubricant and damage to the bearings and seals.

3 Claims, 2 Drawing Figures

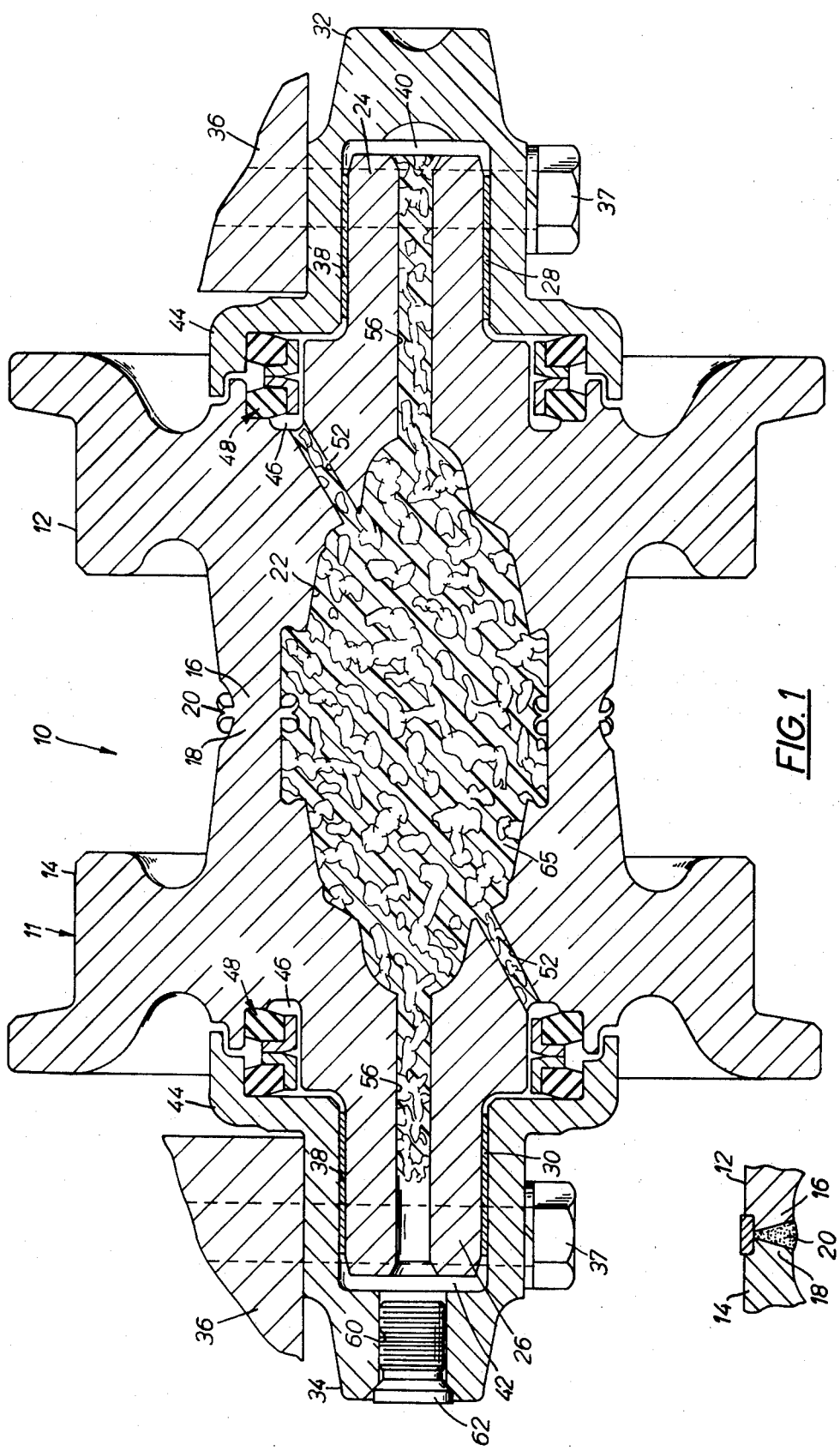

METHOD OF MANUFACTURING TRACK ROLLER WITH OPEN CELL PLASTIC FOAM IN LUBRICATION CAVITY

REFERENCE TO RELATED APPLICATION

This is a divisional application from U.S. Ser. No. 491,768 filed Aug. 6, 1974, entitled *Track Roller With Open Cell Plastic Foam In Lubrication Cavity* issued May 11, 1976 as Patent No. 3,955,646

BACKGROUND OF THE INVENTION

1. Field of Use

This invention relates generally to a method for manufacturing a track carrier roller or track idler for use with continuous tracks on crawler tractors or the like and having an interior lubrication cavity therein. In particular, it relates to a method for providing a solidified mass of open cell foam material in said lubrication cavity and for saturating said mass with lubricant for the bearings associated with such rollers.

2. Description of the Prior Art

Track carrier rollers or track idlers often are manufactured by welding together two castings, each of which has a portion of a lubrication cavity and lubrication passages cast or machined therein. When joined together the two castings define an enclosed lubrication cavity which is adapted to have a lubricant such as oil or grease pumped therethrough through a lubrication port formed in one of the castings. During the manufacturing process, contaminants resulting from welding, heat treating and machining accumulate in the cavity and are transported therefrom along with the lubricant through the lubrication passages to the bearings and bearing seals where they can damage the latter.

One prior art patent discloses a crawler tractor having cylindrical rollers carried by pins which rollers engage the sprocket. These rollers have cavities which are filled with compacted waste material and a lubricant. The roller construction disclosed in the aforesaid patent, however, while somewhat suggestive of a means for retaining a lubricant in the interior cavity of a roller does not present the problem of weld particles or other contaminants resulting from the manufacturing process since the roller is not fabricated from sections joined by welding so as to define a relatively inaccessible cavity.

SUMMARY OF THE INVENTION

In accordance with the manufacturing method of the present invention there is provided a roller for a continuous track on a crawler tractor or the like, which roller comprises two sections welded together to define an interior lubrication storage cavity which communicates by means of lubrication passages to spaces containing bearings and seals and to an exterior lubrication port. Liquid plastic material capable of in situ foaming to form an open cell plastic structure is injected into the cavity and passages through the lubrication port wherein it sets into an open cell plastic mass. Subsequently, a lubricant is injected under pressure through the lubrication port to fill the open cells of the plastic mass and supply the bearing. The open cell plastic mass also provides a barrier or filter for particles of contaminants formed during manufacturing operations such as welding, and which may become lodged in the cavity so that circulating of such contaminants with the lubricant and damage to the bearings and seals is prevented. The open cell plastic mass not only serves to filter contaminants which would be otherwise carried by the lubrication passages into the bearing and seal areas as the track roller rotates and the lubricant in the cavity seeks its own level, but serves also as a means for at least temporarily retaining some lubricant in the cavity for delivery to the bearings, even if the seals were to leak or fail completely.

DESCRIPTION OF THE DRAWINGS

In the single sheet of drawings:

FIG. 1 is a cross sectional view of a roller assembly including a roller housing embodying the invention and having a lubrication cavity and an open cell plastic structure within said cavity; and FIG. 2 is a fragmentary view showing an alternate means of welding together the two members forming the roller housing.

DETAILED DESCRIPTION

Referring to the drawing, the roller assembly embodying the invention is designated at 10 and is adapted to be supported on a track frame of a crawler or track laying vehicle for rolling contact with the conventional endless, ground engaging tracks that are well known in the art.

The roller assembly 10 includes a roller body or housing 11 which is formed from a pair of generally identical cup-shaped members 12 and 14 which have lip portions 16 and 18 permanently fastened together in abutting relationship by a fluid-tight weld indicated at 20. Weld 20 may be formed by conventional welding techniques, as shown in FIG. 2 of the drawing, or by inertial welding techniques, as shown in FIG. 1 of the drawing. The cup-shaped members 12 and 14 form a relatively large axially extending chamber or cavity 22 within the roller body 11 which acts as a lubricant reservoir.

The members 12 and 14 have oppositely extending, reduced end portions forming axially aligned stub axles 24 and 26 which are received in bearings such as sleeve-type bearings, for example, indicated at 28 and 30.

The bearings 28 and 30 are supported, respectively, in facing end caps 32 and 34 which are illustrated as fastened to rail portions 36 forming a part of a track frame by means of bolts 37. Each of the end caps 32 and 34 has a blind bore 38 which receives the bearings 28 and 30 and forms a lubricant receiving cavity 40 and 42 in each of the end caps 32 and 34, respectively, adjacent to the ends of the axles 24 and 26.

Bearings 28 and 30 are interposed between the outer cylindrical surfaces of the axles 24 and 26 and the cylindrical bores 38 formed in the end caps 32 and 34 to enable rotation of the hub portions 12 and 14 relative to the end caps 32 and 34 with a minimum of friction.

Each of the end caps 32 and 34 is provided with an enlarged annular flange portion 44 which is disposed in close proximity to the roller body 11 to form annular seal receiving cavities 46. A seal assembly 48 is disposed in each of the cavities 46 between the rotating hub portions 12 and 14 and the stationary end caps 32 and 34 to isolate the bearings 28 and 30 and to maintain lubricant in the roller assembly 10.

Preferably, each of the seal receiving cavities 46 is placed in communication with the large chamber 22 by means of passages 52 which serve to deliver lubricant to the seals 48 and the bearings 28 and 30. The large chamber 22 also is placed in communication with the chambers 40 and 42 formed in the end caps 32 and 34 by means of axial passages 56 formed in each of the hub members 12 and 14 and disposed in axial alignment with each other.

Preferably, at least one of the end caps 32 or 34 is provided with an inlet port 60 through which lubricant is introduced and which is closed by a threaded plug 62.

The entire chamber 22 and the connecting passages 52 and 56 of the roller body are filled with an open cell structure 65 in the form of a plastic foam. A great number of such plastic foams are available and basically are polymer resins that have been expanded into a cellular structure. The expansion of the resin into an open cell foam can be accomplished chemically by expanding agents or by mechanical techniques, such as blowing with a gas. The open cell foam can be formed in a block for subsequent shaping or in a mold, but, preferably, the resin is introduced in liquid form into one or both of the passages 56 of the roller body 11, and the resin is expanded in place into an open cell foam structure 65 which fills the entire chamber 22. The open cell structure permits lubricant to flow from cell to cell, thereby enabling the cellular mass to be filled with lubricant and enabling the mass to release the retained lubricant over a long period of time. The resultant open cell foam structure 65 is of uniform density and has a sufficient porosity so that it does not significantly reduce the lubricant capacity of the chamber 22. In situ formation of a solidified mass of open cell plastic foam in a cavity is described in detail in the Nov. 11, 1971 issue of *Machine Design* magazine at pages 145 through 149.

After the roller body 11 has been assembled with the end caps 32 and 34 oil or lubricant can be introduced under pressure into the body 65 by way of the lubricant inlet port 60 to fill the spaces in the open cell plastic body 65. The open cell foam structure 65 in the enlarged cavity 22 acts to retain a large quantity of lubricant for relatively slow and uniform delivery to the bearings and seals. In the event of leakage or complete failure of the seals 48, full and instantaneous loss of the lubricant from the body structure 65 is prevented.

During the process of manufacture which includes such operations as forming the weld 20 to join the hub portions 12 and 14 together, heat treating of the roller body 11 and the machining of the various passages and bearing surfaces, contaminants from such operations frequently become lodged within the enlarged lubricant chamber 22 and are extremely difficult, if not impossible, to remove. However, by filling the cavity 22 and the adjoining passages 52 and 56 with a solidified mass of open cell beaded foam, a relatively rigid but porous structure 65 is formed and any contaminants contained in the cavity are immobilized and maintained in the position occupied when the foam structure was formed in the cavity 22. The foam structure 65 also acts as a filter and prevents contaminant material from being conveyed with the lubricant to the critical bearing and seal areas. During manufacture, those passages 52 and 56 not being used for introduction of the liquid foamable resin are temporarily sealed, if necessary, to prevent escape of the liquid resin therethrough before the foam has a chance to set.

A hub assembly has been provided which has a relatively large lubricant reservoir formed by a relatively rigid cellular structure made from an open cell plastic foam material which is disposed in a lubricant reservoir. The open cell plastic material acts as a filter for contaminants in the lubricant and to prevent movement of deleterious fragments of material which may be trapped within the roller body 11 during its manufacture. The arrangement prevents the harmful materials from reaching the critical bearing and seal areas and also serves to dispense the lubricant to the required areas in a manner which retards the loss of the entire supply of lubricant in the event of failure of the lubricant seals between the relatively rotating parts.

I claim:

1. A method of manufacturing a track roller comprising the steps of: providing a track roller having a lubrication cavity therein and at least one passage communicating with said lubrication cavity and accessible from the exterior of said track roller; providing a substance capable of foaming to form a solidified mass of open cell foamed material; supplying a sufficient quantity of said substance through said passage to said cavity wherein said substance foams in situ to form a solidified mass of said material which substantially fills said cavity and supplying a sufficient quantity of a lubricant under pressure through a passage to said cavity to saturate said solidified mass of material in said cavity.

2. A method of manufacturing a track roller comprising the steps of: providing a pair of members, at least one member having a depression therein and at least one member having at least one passage therein for communicating with said depression when said members are brought together; bringing said members together so that they cooperate to define a lubrication cavity; joining said members together by a fluid-tight weld to provide a track roller having a lubrication cavity therein accessible through said passage; providing a substance capable of foaming to form a solidified mass of open cell foamed material; supplying a sufficient quantity of said substance through said passage to said cavity wherein said substance foams in situ to form a solidified mass of said material which substantially fills said cavity and supplying a sufficient quantity of a lubricant under pressure through a passage to said cavity to saturate said solidified mass of material in said cavity.

3. A method according to claim 2 wherein said members are joined together by the process of inertia welding.

* * * * *